United States Patent
Gane et al.

(10) Patent No.: US 8,728,322 B2
(45) Date of Patent: *May 20, 2014

(54) PROCESS FOR THE PURIFICATION OF WATER USING SURFACE TREATED CALCIUM CARBONATE

(75) Inventors: Patrick A. C. Gane, Rothrist (CH); Joachim Schölkopf, Killwangen (CH); Daniel Gantenbein, Gempen (CH); Daniel E. Gerard, Basel (CH)

(73) Assignee: Omya International AG, Oftringen (CH)

( * ) Notice: Subject to any disclaimer, the term of this patent is extended or adjusted under 35 U.S.C. 154(b) by 262 days.

This patent is subject to a terminal disclaimer.

(21) Appl. No.: 12/449,885

(22) PCT Filed: Mar. 19, 2008

(86) PCT No.: PCT/EP2008/053337
§ 371 (c)(1),
(2), (4) Date: Nov. 13, 2009

(87) PCT Pub. No.: WO2008/113840
PCT Pub. Date: Sep. 25, 2008

(65) Prior Publication Data
US 2010/0086987 A1    Apr. 8, 2010

(30) Foreign Application Priority Data
Mar. 21, 2007    (EP) .................................... 07005856

(51) Int. Cl.
*C02F 1/28* (2006.01)

(52) U.S. Cl.
USPC ............ 210/666; 210/688; 210/691; 210/694

(58) Field of Classification Search
USPC ......... 210/663, 666, 679, 681–685, 688, 691, 210/694
See application file for complete search history.

(56) References Cited

U.S. PATENT DOCUMENTS

| | | | |
|---|---|---|---|
| 2,613,181 A | | 10/1952 | Green et al. |
| 3,890,225 A | * | 6/1975 | Kajiyama ..................... 210/688 |
| 4,343,706 A | | 8/1982 | Etzel et al. |
| 4,416,780 A | | 11/1983 | Disselbeck |
| 5,292,365 A | | 3/1994 | Delfosse |
| 5,580,458 A | | 12/1996 | Yamasaki et al. |
| 5,695,733 A | | 12/1997 | Kroc et al. |
| 6,210,526 B1 | | 4/2001 | Pohlen |
| 6,319,412 B1 | * | 11/2001 | Reyna ........................... 210/666 |
| 6,666,953 B1 | | 12/2003 | Gane et al. |
| 7,972,479 B2 | | 7/2011 | Gane et al. |
| 8,057,683 B2 | * | 11/2011 | Gane et al. .................... 210/691 |
| 8,066,884 B2 | * | 11/2011 | Gane et al. .................... 210/691 |
| 2002/0100718 A1 | | 8/2002 | Yamasaki et al. |
| 2003/0196966 A1 | | 10/2003 | Hughes |
| 2004/0020410 A1 | | 2/2004 | Gane |
| 2004/0083316 A1 | | 4/2004 | Chen et al. |
| 2004/0238454 A1 | | 12/2004 | Mori et al. |
| 2005/0175577 A1 | | 8/2005 | Jenkins et al. |
| 2006/0048908 A1 | | 3/2006 | Wang et al. |
| 2006/0186054 A1 | * | 8/2006 | Webb et al. ................... 210/688 |
| 2010/0051216 A1 | | 3/2010 | Gane et al. |
| 2010/0059708 A1 | | 3/2010 | Gane et al. |
| 2010/0084346 A1 | | 4/2010 | Gane et al. |
| 2011/0193011 A1 | | 8/2011 | Gane et al. |
| 2011/0195837 A1 | | 8/2011 | Gane et al. |
| 2011/0209841 A1 | | 9/2011 | Gane et al. |

FOREIGN PATENT DOCUMENTS

| | | |
|---|---|---|
| CZ | 9300287 A3 | 1/1995 |
| EP | 0410877 A1 | 7/1990 |
| EP | 1 186 343 A1 | 3/2002 |
| EP | 1 607 373 | 12/2003 |
| FR | 2666080 A3 | 8/1990 |
| GB | 410739 | 5/1934 |
| GB | 662646 | 8/1948 |
| GB | 786647 | 11/1957 |
| GB | 1518357 | 7/1978 |
| JP | 63229111 A | 9/1988 |
| JP | 8176464 A | 7/1996 |
| JP | 2000516536 A | 12/2000 |
| JP | 2002/346572 | 12/2002 |
| JP | 2006523251 A | 10/2006 |
| TW | 251326 A4 | 11/1995 |
| TW | 273540 A4 | 4/1996 |
| WO | 9526932 A1 | 10/1995 |
| WO | 9852877 A1 | 11/1998 |
| WO | WO 00/39222 | 7/2000 |
| WO | WO 02/064703 | 8/2002 |
| WO | WO 2004/083316 A | 9/2004 |
| WO | WO 2005/042412 A1 | 5/2005 |

OTHER PUBLICATIONS

Ghazy et al, Removal of Lead from Water Samples by Sorption onto Powdered Limestone, Feb. 2007, Separation Science and Technology, vol. 42, Issue 3, pp. 653-667.*
The USGS Water Science School [online], Jan. 2013, Retrieved on Oct. 29, 2013, Retrieved from the internet: URL:http://ga.water.usgs.gov/edu/acidrain.html.*
Sukhorukov G B et al., entitled "Porous calcium carbonate microparticles as templates for encapsulation of bioactive compounds," J. Mater. Chem., 2004, vol. 14, pp. 2073-2081.
Wei S-H et al., entitled "High Surface Area Calcium Carbonate: Pore Structural Properties and Sulfation Characteristics," Ind. Eng. Chem. Res., 1997, vol. 36, pp. 2141-2148.
The International Search Report for PCT Application No. PCT/EP2008/053337.

(Continued)

*Primary Examiner* — Matthew O Savage
(74) *Attorney, Agent, or Firm* — Amster, Rothstein & Ebenstein LLP

(57) ABSTRACT

The present invention relates to a process for the purification of water, wherein a surface-reacted natural calcium carbonate is brought into contact with the water to be purified, the surface-reacted natural calcium carbonate being the reaction product of a natural calcium carbonate with an acid and carbon dioxide, which is formed in situ by the acid treatment and/or supplied externally.

37 Claims, No Drawings

(56) References Cited

OTHER PUBLICATIONS

The Written Opinion of the International Searching Authority for PCT Application No. PCT/EP2008/053337.

Tsai et al. "Adsorption of Bisphenol-A from Aqueous Solution Onto Minterals and Carbon Adsorbents." Journal of Hazardous Materials B134 (2006) 169-175.

Zhang et al. "Removal of Estrone and 17β-estradiol from Water by Adsorption." Water Research 39 (2005) 3991-4003.

Teir et al. "Production of Precipitated Calcium Carbonate from Calcium Silicates and Carbon Dioxide." Energy Conversion and Management 46 (2005) 2954-2979.

Snyder et al. "Role of Membranes and Activated Carbon in the Removal of Endocrine Disruptors and Pharmaceuticals." Desalination 202 (2007) 156-181.

Office Action dated Nov. 19, 2010 for Singapore Application No. 200905034-5.

Office Action dated Feb. 5, 2013 for Japanese Application No. 2009-554025.

Office Action dated Feb. 15, 2013 for Canadian Application No. 2,679,248.

Office Action for dated May 29, 2013 for Taiwanese Application No. 097107301.

Office Action dated Jul. 17, 2013 for Korean Application No. 10-2009-7019821.

\* cited by examiner

PROCESS FOR THE PURIFICATION OF WATER USING SURFACE TREATED CALCIUM CARBONATE

This is a U.S. national phase of PCT Application No. PCT/EP2008/053337, filed Mar. 19, 2008, which claims the benefit of European Application No. 07005856.5, filed Mar. 21, 2007.

The present invention relates to a process for the purification of water using a surface-reacted natural calcium carbonate, and to a flocculated composite material having improved compactness.

There are a wide range of water purification techniques that can be used to remove fine solids, micro-organisms and dissolved inorganic and organic materials. The choice of method will depend on the quality of the water being treated, the cost of the treatment process and the quality standards expected of the processed water.

Flocculation is widely employed in the purification of water such as industrial waste water or drinking water. Flocculation refers to a process where dissolved compounds and/or colloidal particles are removed from the solution in the form of floc or "flakes." The term is also used to refer to the process by which fine particulates are caused to clump together into floc. The floc may then float to the top of the liquid, settle to the bottom of the liquid, or can be readily filtered from the liquid.

Flocculants, or flocculating agents, are chemicals that are used to promote flocculation. Flocculants are used in water treatment processes to improve the sedimentation or filterability of small particles. Many flocculants are multivalent cations such as aluminium, iron, calcium or magnesium. These positively charged molecules interact with negatively charged particles and molecules to reduce the barriers to aggregation. In addition, many of these chemicals, under appropriate pH and other conditions, react with water to form insoluble hydroxides which, upon precipitating, link together to form long chains or meshes, physically trapping small particles into the larger floc.

A common flocculant or coagulant used is aluminium sulfate which reacts with water to form flocs of aluminium hydroxide. Coagulation with aluminum compounds may leave a residue of aluminium in the finished water. Aluminium can be toxic to humans at high concentrations.

Another aluminium-based coagulant is polyaluminium chloride (PAC). In solutions of poly-aluminium chloride (PAC), aluminium ions have formed into polymers consisting of clusters of ions bridged by oxygen atoms. PAC is used e.g. for the treatment of brown drinking water comprising organic materials such as leaves and/or inorganic materials such as iron and manganese compounds which cause the brown discolouration. However, PAC is generally not sufficient to efficiently remove brown discolouration from the water.

Iron(III) chloride is another common coagulant. Iron(III) coagulants work over a larger pH range than aluminum sulfate but are not effective with many source waters. Coagulation with iron compounds typically leaves a residue of iron in the finished water. This may impart a slight taste to the water, and may cause brownish stains on porcelain fixtures. Furthermore, iron(III) chloride presents corrosion risks in the water treatment system.

Polymers can also be used as a flocculant. They are often called coagulant aids used in conjunction with other inorganic coagulants. However, when used in combination with one of the above-mentioned inorganic coagulants such as iron(III) chloride, the polymer needs to be cationic, i.e. needs to have a positive overall charge, for effectively acting as a flocculation aid. The long chains of positively charged polymers can help to strengthen the floc making it larger, faster settling and easier to filter out. Due to the restriction to cationic polymers, the process flexibility is reduced.

A known polymeric flocculant is polyacrylamide. By use of specific comonomers, anionic as well as cationic polyacrylamide can be provided. However, as already indicated above, when used in combination with inorganic coagulants such as iron(III) chloride, only cationic polyacrylamide is effective.

Subsequent to the water purification process, the flocculated material needs to be removed from the water, e.g. by filtration, and to be disposed. However, the higher the volume of the precipitated material, e.g. in the form of a filter cake, the higher the disposal costs.

Another process feature which needs to be considered is the rate of flocculation and sedimentation, respectively. Of course, to speed up the purification process, a high flocculation rate is desired. However, any improvement in flocculation rate should not be achieved on the expense of purification efficiency. Furthermore, improved flocculation rate should not have a detrimental impact on the volume of the precipitated material.

With reference to the domain of waste water treatment, the skilled man knows GB1518357, which relates to a process for purifying industrial and/or agricultural waste water highly polluted with organic substances, which comprises mixing the waste water with sufficient alkalizing agent containing calcium to raise the pH above 9, thereafter saturating the water with carbon dioxide, coagulating the resulting precipitate by mixing the treated water with a coagulating agent and separating the coagulated precipitate from the water.

The skilled man also knows EP0410877, which relates to a composition of matter for the chemical and biological purification of contaminated waters, said composition being destined to be spread in the water to be purified and characterised in that it comprises at least two of the following materials in granular form: —a porous calcium carbonate rich in oligoelements, —an alumina silicate hydrate containing alkaline earth metals. These two materials contain in the adsorbed state specific bacteria for the biological degradation of organic materials containing a carbon chain.

Also in this domain, the abstract of JP632291 [ ] discloses a microparticle powder of calcium carbonate or crushed charcoal with a grain size of 0.05-0.001 mm used as a flocculant for water purification.

FR2666080 discloses an inorganic composition based on aluminium salt for water purification treatment, characterised in that it is in the form of a powder consisting of a mixture of aluminium salt and of calcium carbonate.

The abstract of JP4131198 discloses a waste water purification process wherein waste water is exposed to an air dispersed as particles in a size of 0.5-10 micrometers. The air dispersed as the particles stirs the waste water sufficiently to promote the flocculation. A liquid containing minerals extracted from weathered granites and the like is injected into an acidic side of pH to obtain 100-3000 ppm of a primary treatment water. A neutralized secondary treatment water is caused to float under pressure and stirred to remove a sludge and a tertiary treatment water is filtered by filtering means comprising a granulate of minerals such as calcium carbonate and a granular active carbon.

The abstract of JP9038414 discloses a flocculating precipitant contains coarse particles of calcium carbonate having 50-500 micrometers average particle diameter and fine particles of calcium carbonate having 1-30 micrometers average particle diameter.

WO 95/26932 discloses a method for treating water contaminated with algae, suspended solids, or toxic heavy metal compounds, said method comprising the steps: (a) adding to the water a soluble metal salt flocculent in a quantity of between 5-100 milligrams per liter of the water; (b) adding to the water 50-2000 milligrams of coccolithic calcium carbonate per liter of water; and (c) forming a floc including said algae, suspended solids, or toxic heavy metal compounds in said water at a pH of at least about 7.0.

GB410739 discloses a process for the purification and decolourisation of waster wherein the water is successively or simultaneously passed in contact with a substantially insoluble mild acid-neutralising agent such as, among others, calcium carbonate, and a defined adsorptive agent.

The skilled man is also aware of documents relating to the specific removal of fluorides from waste water.

In this context, he knows GB786647, which relates to a method for the removal of fluorides dissolved in water which method comprises subjecting the water to treatment at a temperature of 50° C. or more with tri-calcium ortho-phosphate, and calcium carbonate and/or magnesium carbonate.

In this context, he also knows U.S. Pat. No. 5,580,458, which relates to a method for waste water treatment, comprising the steps of: (a) introducing fluorine-containing waste water into a first tank packed with a calcium carbonate mineral; (b) agitating said fluorine-containing waste water in the first tank through aeration by diffused air to cause fluorine in the waste water to react with the calcium carbonate mineral to form flocs of calcium fluoride, said calcium carbonate mineral being also aerated by the diffused air; (c) introducing the waste water from the first tank to a second tank packed with a calcium carbonate mineral; (d) agitating the waste water in the second tank through aeration by diffused air to cause fluorine in the waste water to react with the calcium carbonate mineral to form flocs of calcium fluoride, said calcium carbonate mineral being also aerated by the diffused air, said aeration being sufficient to cause airborne microorganisms to accumulate said fluorine in said waste water in vivo; and (e) separating the flocs from the waste water.

Finally, the skilled man knows US 2002/100718, which relates to a waste water treatment method for treating a fluorine waste water containing organic matter, nitrogen, phosphor and hydrogen peroxide by introducing the waste water into an anaerobic tank and an aerobic tank, comprising: a calcium carbonate mineral placed in the anaerobic tank; a biologically treated water of another system introduced into the aerobic tank; and a calcium carbonate mineral placed in the aerobic tank.

Considering the drawbacks of known flocculants mentioned above, it is an object of the present invention to provide a water purification process of improved economical efficiency in combination with improved operation flexibility while still resulting in an efficient removal of water impurities. In particular, the present invention aims at reducing the volume of the flocculated material and expanding the scope of polymer flocculants to anionic polymers while still keeping the degree of water purification on a high level.

The object outlined above has been solved by a process for the purification of water, wherein a surface-reacted natural calcium carbonate is brought into contact with the water to be purified, the surface-reacted natural calcium carbonate being the reaction product of a natural calcium carbonate with an acid and carbon dioxide, which is formed in situ by the acid treatment and/or supplied externally, and the surface-reacted natural calcium carbonate being prepared as an aqueous suspension having a pH is of greater than 6.0, measured at 20° C.

The term "purification" is to be interpreted broadly and means any removal of harmful compounds and/or other compounds not tolerated in the water.

The water preferably treated by the process of the present invention includes industrial waste water, drinking water, urban waste water, waste water from breweries or from other beverage industries, or waste water in the paper industry.

The surface-reacted natural calcium carbonate as defined above and further below is efficiently adsorbing organic as well as inorganic impurities on its surface. Furthermore, process flexibility is improved since the surface-reacted natural calcium carbonate enables the use of cationic as well as anionic polymeric flocculants. Surprisingly, the use of the surface-reacted natural calcium carbonate of the present invention results in a flocculated material of improved compactness.

The surface-reacted natural calcium carbonate to be used in the process of the present invention is obtained by reacting a natural calcium carbonate with an acid and with carbon dioxide, wherein the carbon dioxide is formed in situ by the acid treatment and/or is supplied from an external source.

Preferably, the natural calcium carbonate is selected from a marble, a chalk, a calcite, a dolomite, a limestone, or mixtures thereof. In a preferred embodiment, the natural calcium carbonate is ground prior to the treatment with an acid and carbon dioxide. The grinding step can be carried out with any conventional grinding device such as a grinding mill known to the skilled person.

The surface-reacted natural calcium carbonate to be used in the water purification process of the present invention is prepared as an aqueous suspension having a pH, measured at 20° C., of greater than 6.0, preferably greater than 6.5, more preferably greater than 7.0, even more preferably greater than 7.5. As will be discussed below, the surface-reacted natural calcium carbonate can be brought into contact with the water to be purified by adding said aqueous suspension to the water. It is also possible to modify the pH of the aqueous suspension prior to its addition to the water to be purified, e.g. by dilution with additional water. Alternatively, the aqueous suspension can be dried and the surface-reacted natural calcium carbonate brought into contact with the water is in powder form or in the form of granules. In other words, the increase of pH to a value of greater than 6.0 subsequent to treatment with an acid and carbon dioxide is needed to provide the surface-reacted calcium carbonate having the beneficial adsorption properties described herein.

In a preferred process for the preparation of the aqueous suspension, the natural calcium carbonate, either finely divided (such as by grinding) or not, is suspended in water. Preferably, the slurry has a content of natural calcium carbonate within the range of 1 wt % to 80 wt %, more preferably 3 wt % to 60 wt %, and even more preferably 5 wt % to 40 wt %, based on the weight of the slurry.

In a next step, an acid is added to the aqueous suspension containing the natural calcium carbonate. Preferably, the acid has a $pK_a$ at 25° C. of 2.5 or less. If the $pK_a$ at 25° C. is 0 or less, the acid is preferably selected from sulphuric acid, hydrochloric acid, or mixtures thereof. If the $pK_a$ at 25° C. is from 0 to 2.5, the acid is preferably selected from $H_2SO_3$, $HSO_4^-$, $H_3PO_4$, oxalic acid or mixtures thereof. The one or more acids can be added to the suspension as a concentrated solution or a more diluted solution. Preferably, the molar ratio of the acid to the natural calcium carbonate is from 0.05 to 4, more preferably from 0.1 to 2.

As an alternative, it is also possible to add the acid to the water before the natural calcium carbonate is suspended.

In a next step, the natural calcium carbonate is treated with carbon dioxide. If a strong acid such as sulphuric acid or hydrochloric acid is used for the acid treatment of the natural calcium carbonate, the carbon dioxide is automatically formed. Alternatively or additionally, the carbon dioxide can be supplied from an external source.

Acid treatment and treatment with carbon dioxide can be carried out simultaneously which is the case when a strong acid is used. It is also possible to carry out acid treatment first, e.g. with a medium strong acid having a $pK_a$ in the range of 0 to 2.5, followed by treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the acid treatment step and/or the carbon dioxide treatment step are repeated at least once, more preferably several times.

Subsequent to the acid treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural calcium carbonate as an aqueous suspension having a pH of greater than 6.0, preferably greater than 6.5, more preferably greater than 7.0, even more preferably greater than 7.5. If the aqueous suspension is allowed to reach equilibrium, the pH is greater than 7. A pH of greater than 6.0 can be adjusted without the addition of a base when stirring of the aqueous suspension is continued for a sufficient time period, preferably 1 hour to 10 hours, more preferably 1 to 5 hours.

Alternatively, prior to reaching equilibrium, which occurs at a pH of greater than 7, the pH of the aqueous suspension may be increased to a value greater that 6 by adding a base subsequent to carbon dioxide treatment. Any conventional base such as sodium hydroxide or potassium hydroxide can be used.

With the process steps described above, i.e. acid treatment, treatment with carbon dioxide and pH adjustment, a surface-reacted natural calcium carbonate is obtained having good adsorption properties for organic as well as inorganic impurities which might be present in waste water. Furthermore, the surface-reacted natural calcium carbonate can be used in combination with cationic as well as anionic flocculants as will be described in further detail below.

Further details about the preparation of the surface-reacted natural calcium carbonate are disclosed in WO 00/39222 and US 2004/0020410 A1, the content of these references herewith being included in the present application. According to these documents, the surface-reacted natural calcium carbonate is used as a filler for paper manufacture.

In a preferred embodiment of the preparation of the surface-reacted natural calcium carbonate, the natural calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural calcium carbonate before adding the acid and/or carbon dioxide. Alternatively, the silicate and/or silica and/or aluminium hydroxide and/or earth alkali aluminate and/or magnesium oxide component(s) can be added to the aqueous suspension of natural calcium carbonate while the reaction of natural calcium carbonate with an acid and carbon dioxide has already started. Further details about the preparation of the surface-reacted natural calcium carbonate in the presence of at least one silicate and/or silica and/or aluminium hydroxide and/or earth alkali aluminate component(s) are disclosed in WO 2004/083316, the content of this reference herewith being included in the present application.

The surface-reacted natural calcium carbonate can be kept in suspension, optionally further stabilised by a dispersant. Conventional dispersants known to the skilled person can be used. The dispersant can be anionic or cationic. A preferred dispersant is polyacrylic acid.

Alternatively, the aqueous suspension described above can be dried, thereby obtaining the surface-reacted natural calcium carbonate in the form of granules or a powder.

In a preferred embodiment, the surface-reacted natural calcium carbonate has a specific surface area of from 5 $m^2/g$ to 200 $m^2/g$, more preferably 20 $m^2/g$ to 80 $m^2/g$ and even more preferably 30 $m^2/g$ to 60 $m^2/g$, measured using nitrogen and the BET method according to ISO 9277.

Furthermore, it is preferred that the surface-reacted natural calcium carbonate has a mean grain diameter of from 0.1 to 50 μm, more preferably from 0.5 to 25 μm, even more preferably 0.7 to 7 μm, measured according to the sedimentation method. The measurement of mean grain diameter was performed on a Sedigraph 5100™ instrument, as described in further detail in the experimental section below.

In a preferred embodiment, the surface-reacted natural calcium carbonate has a specific surface area within the range of 15 to 200 $m^2/g$ and a mean grain diameter within the range of 0.1 to 50 μm. More preferably, the specific surface area is within the range of 20 to 80 $m^2/g$ and the mean grain diameter is within the range of 0.5 to 25 μm. Even more preferably, the specific surface area is within the range of 30 to 60 $m^2/g$ and the mean grain diameter is within the range of 0.7 to 7 μm.

Preferably, the surface-reacted natural calcium carbonate has an intra-particle porosity within the range of 20% vol to 40% vol, measured by mercury porosimetry. Details about the measuring method are provided below in the experimental section.

In the process of the present invention, the surface-reacted natural calcium carbonate is brought into contact with the water to be purified, e.g. industrial waste water, drinking water, urban waste water, waste water from breweries, or water in the paper industry, by any conventional means known to the skilled person.

The surface-reacted natural calcium carbonate can be added as an aqueous suspension, e.g. the suspension described above. Alternatively, it can be added to the water to be purified in any appropriate solid form, e.g. in the form of granules or a powder or in the form of a cake. Within the context of the present invention, it is also possible to provide an immobile phase, e.g. in the form of a cake or layer, comprising the surface-reacted natural calcium carbonate, the water to be purified running through said immobile phase. This will be discussed in further detail below.

The water may contain organic impurities, e.g. resulting from human waste, organic materials, soil, surfactants as well as inorganic impurities, in particular heavy metal impurities such as iron- or manganese-containing compounds. Harmful components that can be removed from the water with the purification process of the present invention also include microorganism such as bacteria, fungi, archaea, or protists.

In a preferred embodiment, the water to be purified contains polycyclic compounds, cholesterol, and/or endocrine disrupting compounds (EDCs), such as e.g. endogenous hormones such as 17β-estradiol (E2), estrone (E1), estriol (E3), testosterone or dihydro testosterone; phyto and myco hormones such as β-sitosterol, genistein, daidzein or zeraleon; drugs such as 17α-ethinylestradiol (EE2), mestranol (ME), diethylstilbestrol (DES), and industrial chemicals such as 4-nonyl phenol (NP), 4-tert-octyl phenol (OP), bisphenol A (BPA), tributyltin (TBT), methylmercury, phthalates, PAK or PCB.

In case the water to be purified contains one or more polycyclic compounds, cholesterol, and/or endocrine disrupting compounds, the surface-reacted natural calcium carbonate is preferably used in combination with activated carbon.

The EDCs, which can be removed from the water by the process of the present invention are selected from the group comprising, e.g. endogenous hormones such as 17β-estradiol (E2), estrone (E1), estriol (E3), testosterone or dihydro testosterone; phyto and myco hormones such as β-sitosterol, genistein, daidzein or zeraleon; drugs such as 17α-ethinylestradiol (EE2), mestranol (ME), diethylstilbestrol (DES), and industrial chemicals such as 4-nonyl phenol (NP), 4-tert-octyl phenol (OP), bisphenol A (BPA), tributyltin (TBT), methylmercury, phthalates, PAK or PCB. Furthermore iodised contrast agents for X-ray-analysis e.g. ioxithalamate, fluorochinolones like ciprofoxacine and antibiotics like macrolides and sulfonamides can be removed by the process of the present invention.

It has furthermore been found that the removal of polycyclic compounds, cholesterol, and/or EDCs from an aqueous medium is especially effective, when the surface-reacted calcium carbonate is used in combination with activated carbon.

Activated carbon is a well-known potent adsorbent, having however the backdraw that the adsorption very often is not very fast and that its removal from the medium to be treated is very difficult due to its fine division in the medium.

It is therefore an especially preferred embodiment of the present invention, that activated carbon is additionally added to the aqueous medium containing EDCs.

The activated carbonate can be added simultaneously with, prior to or after the addition of the surface-reacted natural calcium carbonate.

The use of the surface-reacted natural calcium carbonate together with activated carbon on the one hand provides for a very efficient adsorption of substances such as EDCs by the excellent adsorption properties of both of the adsorbents, and on the other hand additionally improves the removability of activated carbon by forming composites therewith, also if it has already substances adsorbed onto its surfaces, resulting in a further improved removal of EDCs due to the synergistic interaction between surface-reacted natural calcium carbonate and activated carbon, the resulting composites being easily separable from the aqueous medium.

In this respect it is especially preferred that the activated carbon is added to the aqueous medium prior to the addition of the surface-reacted natural calcium carbonate. In this embodiment, the EDCs are essentially first adsorbed to the activated carbon and the resulting composite is essentially subsequently adsorbed by the surface-reacted calcium carbonate providing for an improved removability of the activated carbon, and the EDCs attached thereto, respectively.

It has also been realized that the surface-reacted natural calcium carbonate can efficiently adsorb the activated carbon, irrespective of the type of species adsorbed on the activated carbon. Thus, within the context of the present invention, the surface-reacted natural calcium carbonate in combination with the activated carbon can be used in the purification of water containing organic impurities different from the EDCs mentioned above.

Any activated carbon known in the art can be used in the process of the present invention. Examples of activated carbons useful in the present invention are e.g. available from Fluka, such as article No. 05112 (p.a. for gc; grain size 0.3 to 0.5 mm; bulk density 410 kg/m$^3$), from Aldrich such as article number 484156 (glassy spherical powder, grain size 10-40 µm), from Sigma-Aldrich such as article No. 242276 (Darco® G-60, powder, −100 mesh particle size); from Riedel-de Haen (article No. 18002, purum, granulated), or Lurgi Hydrafin CC 8×30 (Donau Carbon GmbH & Co. KG, Frankfurt am Main, Germany) or activated carbon available from Fluka (article No. 05112).

For example, the activated carbon particles can have a grain size of 0.1 µm to 5 mm, preferably 10 µm to 2 mm, 0.1 mm to 0.5 mm, e.g. 0.3 mm.

Preferably, the weight ratio of the surface-reacted natural calcium carbonate to the activated carbon is from 1:1 to 1:100, more preferably from 1:5 to 1:80, especially 1:10 to 1:70 or 1:20 to 1:50, e.g. 1:30 or 1:40.

Preferably, the surface-reacted natural calcium carbonate is suspended in the water, e.g. by agitation means. The amount of surface-reacted natural calcium carbonate depends on the type of water to be treated as well as on the type and amount of impurities. Preferably, an amount of 10 ppm to 1 wt %, more preferably 100 ppm to 0.2 wt % surface-reacted natural calcium carbonate, based on the weight of the water to be treated, is added.

In a preferred embodiment, the pH of the water to be treated is adjusted to a value of greater than 6.0, more preferably greater than 6.5, and even more preferably greater than 7.0.

In a preferred embodiment of the present invention, a polymeric flocculant is added to the water to be purified subsequent to the addition of the surface-reacted natural calcium carbonate. Preferably, the polymeric flocculant is added when adsorption of impurities on the surface-reacted natural calcium carbonate has reached its maximum, i.e. there is no further decrease of impurities within the water. However, it is also possible to add the polymeric flocculant at an earlier stage, e.g. when at least 75%, at least 85% or at least 95% of maximum adsorption of impurities on the surface-reacted natural calcium carbonate has been reached.

Any polymeric flocculant known in the art can be used in the process of the present invention. Examples of preferred polymeric flocculants include polyacrylamides or polyelectrolytes based on polyacrylates, polyethyleneimines, or mixtures of these, and natural polymers such as starch, or natural modified polymers like modified carbohydrates. Other preferred flocculants that can be mentioned are egg-white and gelatine.

The polymeric flocculant can be ionic or non-ionic.

Preferably, the polymeric flocculant has a weight average molecular weight of at least 100,000 g/mole. In a preferred embodiment, the polymeric flocculant has a weight average molecular weight within the range of 100,000 to 10,000,000 g/mole.

As already discussed above, the surface-reacted natural calcium carbonate can be used in combination with a cationic polymeric flocculant as well with an anionic polymeric flocculant, thereby improving process flexibility in water treatment. Thus, in a preferred embodiment the polymeric flocculant which is added to the water subsequent to the addition of the surface-reacted natural calcium carbonate is cationic whereas in another preferred embodiment the polymeric flocculant is anionic.

In the context of the present invention, the term "cationic" refers to any polymer having a positive overall charge. Thus, the presence of some anionic monomer units is not excluded as long as there are still sufficient cationic monomer units providing a positive overall charge and enabling its use as a flocculant. Furthermore, the term "cationic polymeric flocculant" also comprises those polymers having monomer units with functional groups which become cationic upon addition to the water to be treated, e.g. amine groups becoming ammonium groups in acidic water.

The term "anionic" refers to any polymer having a negative overall charge. Thus, the presence of some cationic monomer units is not excluded as long as there are still sufficient anionic monomer units providing a negative overall charge and enabling its use as a flocculant. Furthermore, the term "anionic polymeric flocculant" also comprises those polymers having monomer units with functional groups which become anionic upon addition to the water to be treated, e.g. acid groups such as sulfonic acid groups.

A preferred polymeric flocculant of the present invention is polyacrylamide. By appropriate modifications which are known to the skilled person, the polyacrylamide can be used as a cationic flocculant as well as an anionic flocculant.

Preferably, the polyacrylamide contains at least 50 mol %, more preferably at least 60 mol %, even more preferably at least 75 mol % monomer units derived from acrylamide.

An anionic polyacrylamide, i.e. a polyacrylamide having a negative overall charge, can be obtained by introducing appropriate comonomer units, e.g. derived from (meth) acrylic acid.

A cationic polyacrylamide, i.e. a polyacrylamide having a positive overall charge, can be obtained by introducing appropriate comonomer units, e.g. derived from aminoalkyl(meth) acrylates such as dimethylaminomethyl(meth)acrylate, dimethylaminoethyl(meth)acrylate, dimethylaminopropyl (meth)acrylate, diethylaminomethyl(meth)acrylate, diethylaminoethyl(meth)acrylate or diethylaminopropyl (meth)acrylate which can be quaternised by alkyl halides.

In a preferred embodiment, the polyacrylamide has a weight average molecular weight within the range of 100 000 g/mole to 10 000 000 g/mole.

Optionally, further additives can be added to the water sample to be treated. These might include agents for pH adjustment and conventional flocculants such as polyaluminium chloride, iron chloride or aluminium sulphate. However, in a preferred embodiment, the water purification process of the present invention does not use any additional conventional inorganic flocculant such as polyaluminium chloride, iron chloride or aluminium sulphate.

In a preferred embodiment, a natural calcium carbonate which has not been surface-reacted as described above is added as well.

After the flocculation step has been completed, the flocculated material can be separated from the water sample by conventional separation means known to the skilled person such as sedimentation and filtration.

In an alternative approach, the liquid to be purified is preferably passed through a permeable filter comprising the surface-reacted natural calcium carbonate and being capable of retaining, via size exclusion, the impurities on the filter surface as the liquid is passed through by gravity and/or under vacuum and/or under pressure. This process is called "surface filtration".

In another preferred technique known as depth filtration, a filtering aid comprising of a number of tortuous passages of varying diameter and configuration retains impurities by molecular and/or electrical forces adsorbing the impurities onto the surface-reacted natural calcium carbonate which is present within said passages, and/or by size exclusion, retaining the impurity particles if they are too large to pass through the entire filter layer thickness.

The techniques of depth filtration and surface filtration may additionally be combined by locating the depth filtration layer on the surface filter; this configuration presents the advantage that those particles that might otherwise block the surface filter pores are retained in the depth filtration layer.

One option to introduce a depth filtration layer onto the surface filter is to suspend a flocculating aid in the liquid to be filtered, allowing this aid to subsequently decant such that it flocculates all or part of the impurities as it is deposited on a surface filter, thereby forming the depth filtration layer. This is known as an alluvium filtration system. Optionally, an initial layer of the depth filtration material may be pre-coated on the surface filter prior to commencing alluvium filtration.

According to a further aspect of the present invention, a composite material is provided comprising the surface-reacted natural calcium carbonate as defined above and at least one of the impurities as disclosed above, in particular inorganic impurities such as heavy metal ions, organic impurities including endocrine disrupting compounds, and/or microorganisms.

Preferably, the composite material further comprises a polymeric flocculant as defined above and/or activated carbon as defined above.

When the surface-reacted natural calcium carbonate is used in combination with a polymeric flocculant as defined above, in particular with a polyacrylamide flocculant as defined above, it has surprisingly been found that a flocculated material of improved compactness is obtained while still maintaining flocculation efficiency on a high level.

If the flocculated material is separated from the water by filtration, the composite material can be present in the form of a filter cake.

The invention is now described in further detail by the following examples, which are not limiting the scope of the present invention.

EXAMPLES

Measuring Methods

Mean Grain Diameter (d50)

Mean grain diameter and grain diameter distribution are determined via the sedimentation method, i.e. an analysis of sedimentation behaviour in a gravimetric field. The measurement is made with a Sedigraph™ 5100 of Microtronics. The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and supersonic.

Specific Surface Area

The specific surface area is measured via the BET method according to ISO 9277 using nitrogen.

Dewatering According to the "Sieving Test Method"

An aqueous sludge sample, e.g. from a municipal sewage plant, is treated with the flocculant(s) to be tested. Subsequent to the flocculation treatment, the sludge sample is filtered and dewatered on a metal sieve having a mesh size of 200 µm. The time needed for dewatering a given amount of filtrate and the clarity of the water running through the filter are determined. Values for clarity are provided on a scale from 0 to 46, wherein 46 indicates the highest level of clarity.

Type and Amount of Impurities

The type and amount of impurities which are present in the water samples before and after treatment according to the process of the present invention were determined using Optima 3200 XL ICP-OES instrumentation from Perkin-Elmer. The samples were directly analysed following treatment with SRCC.

Turbidity

Turbidity of the water samples was measures using a Hach 2100P Iso Turbidimeter.

pH of the Suspension

The pH of the aqueous suspension is measured using a standard pH-meter.

Intra-Particle Porosity by Mercury Porosimetry

Tablets were made from suspensions of the surface-reacted natural calcium carbonate. The tablets are formed by applying a constant pressure to the suspension/slurry for several hours such that water is released by filtration through a fine 0.025 μm filter membrane resulting in a compacted tablet of the pigment. The tablets are removed from the apparatus and dried in an oven at 80° C. for 24 hours.

Once dried, single portions from each of the tablet blocks were characterised by mercury porosimetry for both porosity and pore size distribution using a Micromeritics Autopore IV mercury porosimeter. The maximum applied pressure of mercury was 414 MPa, equivalent to a Laplace throat diameter of 0.004 μm (i.e. ~nm). The mercury intrusion measurements were corrected for the compression of mercury, expansion of the penetrometer and compressibility of the solid phase of the sample. Further details of the measuring method are described in *Transport in Porous Media* (2006) 63: 239-259.

Example 1

In example 1, the adsorption capacity of the surface-reacted natural calcium carbonate with regard to different heavy metals is determined.

500 g of a heavy metal solution, containing 5 ppm each of cadmium, chromium, copper, mercury, nickel, and lead was stirred for 15 minutes with 3% (w/w %) surface-reacted natural calcium carbonate. The solution was left for 24 hours at pH 11.5 and the upper liquid phase was analysed with ion chromatography (Dionex DX 120 Ion-Chromatograph).

The surface-reacted natural calcium carbonate was prepared as follows:

A finely divided natural calcium carbonate originating from Omey, France, was suspended to achieve a suspension of approximately 16% by weight of dry matter. The slurry thus formed is then treated by slow addition of phosphoric acid at a temperature of approximately 55° C., sufficient to provide a product featuring a BET specific surface area of 35 m$^2$/g according to ISO standard 92777, and an approximate number average diameter of 10 micrometers estimated from scanning electron microscope images obtained using a LEO 435 VPe scanning electron microscope.

The results are summarised in Table 1.

TABLE 1

Treatment of heavy metal ion solution with surface-reacted calcium carbonate

| | Amount of cadmium (ppm) | Amount of chromium (ppm) | Amount of copper (ppm) | Amount of mercury (ppm) | Amount of nickel (ppm) | Amount of lead (ppm) |
|---|---|---|---|---|---|---|
| Untreated solution | 5.0 | 5.0 | 5.0 | 5.0 | 5.0 | 5.0 |
| Solution after treatment | <0.1 | <0.1 | <0.1 | <0.1 | 0.5 | <0.1 |

TABLE 1-continued

Treatment of heavy metal ion solution with surface-reacted calcium carbonate

| | Amount of cadmium (ppm) | Amount of chromium (ppm) | Amount of copper (ppm) | Amount of mercury (ppm) | Amount of nickel (ppm) | Amount of lead (ppm) |
|---|---|---|---|---|---|---|
| Sediment obtained after treatment | 2.6 | 2.5 | 3.2 | 2.1 | 3.7 | 2.6 |

It is obvious that the surface-reacted natural calcium carbonate was able to reduce cadmium, chromium, copper, mercury, and lead very efficiently. From the originally dissolved 5 ppm, less than 0.1 ppm was recovered in the treated sample. For nickel, 90% of the starting amount of 5 ppm was adsorbed and thus removed from the solution.

Example 2

In Example 2, the adsorption capacity of the surface-reacted natural calcium carbonate with regard to microorganisms is determined.

A barm suspension of 100 ppm was used with a germ count of 6*10$^5$ cfu/cm$^3$. In a first experiment, the barm suspension was filtered through a blue band paper filter. In a second experiment, the suspension was filtered through a layer made of the surface-reacted natural calcium carbonate, the layer having a diameter of 90 mm and a thickness of 30 mm.

The surface-reacted natural calcium carbonates was prepared as follows:

Two samples were tested and provided the same results within 0.5%.

First surface-reacted natural calcium carbonate:

A finely divided natural calcium carbonate originating from Omey, France, was suspended to achieve a suspension of approximately 16% by weight of dry matter. The slurry thus formed is then treated by slow addition of phosphoric acid at a temperature of approximately 55° C., sufficient to provide a product featuring a BET specific surface area of 35 m$^2$/g according to ISO standard 92777, and an approximate number average diameter of 10 micrometers estimated from scanning electron microscope images obtained using a LEO 435 VPe scanning electron microscope.

Second surface-reacted natural calcium carbonate:

A finely divided natural calcium carbonate originating from Molde, Norway, was suspended to achieve a suspension of approximately 16% by weight of dry matter. The slurry thus formed is then treated by slow addition of phosphoric acid at a temperature of approximately 55° C., sufficient to provide a product featuring a BET specific surface area of 50 m$^2$/g according to ISO standard 92777, and an approximate number average diameter of 20 micrometers estimated from scanning electron microscope images obtained using a LEO 435 VPe scanning electron microscope.

The results are shown in Table 2.

TABLE 2

Filtration of barm suspension through different filter materials

| | Germ count of suspension (cfu/ml) |
|---|---|
| Untreated suspension | 6 * 10$^5$ |
| Suspension after filtering through paper filter | 6 * 10$^5$ |
| Suspension after filtering through filter | 7 * 10$^3$ |

TABLE 2-continued

Filtration of barm suspension through different filter materials

| | Germ count of suspension (cfu/ml) |
|---|---|
| layer made of surface-reacted calcium carbonate | |

The results indicate that the use of the surface-reacted natural calcium carbonate reduced the germ count by a factor of 100.

Example 3

In Example 3, river water was subjected to the purification method of the present invention. 100 ppm surface-reacted natural calcium carbonate and 4 ppm polyaluminium chloride were suspended in a river water sample. After two minutes, the flocculated solids were filtered off and the filtrate was analysed for its content of iron and manganese.

The surface-reacted natural calcium carbonate used in Example 3 was prepared as follows:

A finely divided natural calcium carbonate originating from Vermont, U.S.A, containing 800 ppm of magnesium oxide and 2500 ppm anionic polyacrylate dispersant per equivalent dry gram of calcium carbonate, was suspended to achieve a suspension of approximately 16% by weight of dry calcium carbonate. The slurry thus formed is then treated by slow addition of phosphoric acid at a temperature of approximately 55° C., sufficient to provide a product featuring a BET specific surface area of 68 m²/g according to ISO standard 92777, and a d50 of 10 micrometers measured by means of the Sedigraph™ 5100 from Micromeritics™.

The results are summarized in Table 3.

TABLE 3

Treatment of river water with surface-reacted calcium carbonate

| | Amount of iron (mg/l) | Amount of manganese (mg/l) |
|---|---|---|
| River water sample before treatment | 2.03 | 0.88 |
| River water sample after treatment | 0.023 | 0.104 |

The results clearly indicate that treatment with the surface-reacted natural calcium carbonate significantly reduces the amounts of heavy metal ions such as iron and manganese.

Example 4

The example concerns the process of treating water coming from sludge samples which were provided from a municipal sewage plant. To these samples the following compositions were added in varying amounts:
(a) a cationic polyacrylamide having cationic acrylic acid monomer units, the polyacrylamide being commercialised under the trade name Praestol™ 857 BS,
(b) the polyacrylamide mentioned under (a) in combination with iron(III) chloride. FeCl₃ was provided as an 10 vol % aqueous solution,
(c) the polyacrylamide mentioned under (a) in combination with the surface-reacted natural calcium carbonate The surface-reacted natural calcium carbonate was prepared as follows:

Finely divided natural calcium carbonate originating from Vermont, U.S.A, containing 800 ppm of magnesium oxide and 2500 ppm anionic polyacrylate dispersant per equivalent dry gram of calcium carbonate, was suspended to achieve a suspension of approximately 16% by weight of dry calcium carbonate. The slurry thus formed is then treated by slow addition of phosphoric acid at a temperature of approximately 55° C., sufficient to provide a product featuring a BET specific surface area of 68 m²/g according to ISO standard 92777, and a d50 of 10 micrometers measured by means of the Sedigraph™ 5100 from Micromeritics™.

The product was spray dried using a Mobil Minor spray dryer from Niro A/S.

Each sample was subjected to the Sieving Test Method described above and time for dewatering the filtrate as well as clarity of the water running through the filter were determined.

The results are summarized in Table 4.

TABLE 4

Dewatering according to Sieving Test Method

| | Dewatering time [sec] with added amount of PAA of 4.5 kg/t dry matter | Clarity | Dewatering time [sec] with added amount of PAA of 4.8 kg/t dry matter | Clarity | Dewatering time [sec] with added amount of PAA of 5.2 kg/t dry matter | Clarity | Dewatering time [sec] with added amount of PAA of 5.5 kg/t dry matter | Clarity |
|---|---|---|---|---|---|---|---|---|
| Polyacryl-amide, no pretreatment | 83 | 6 | 38 | 10 | 25 | 19 | 17 | 34 |
| PAA with 1 kg FeCl₃/m³ sludge | 16 | 46 | 12 | 46 | 11 | 46 | 10 | 46 |
| PAA with 1 kg surface-reacted CC/m³ sludge | 26 | 5 | 22 | 16 | 18 | 26 | 17 | 46 |
| PAA with 2 kg FeCl₃/m³ sludge | 18 | 46 | 14 | 46 | 12 | 46 | 9 | 46 |
| PAA with 2 kg surface-reacted CC/m³ sludge | 22 | 46 | 18 | 46 | 17 | 46 | 14 | 46 |

The results indicate that the surface-reacted natural calcium carbonate in combination with a polymeric flocculant such as polyacrylamide is an efficient flocculation system, comparable to flocculation systems commonly used such as iron(III) chloride in combination with polyacrylamide.

Example 5

The example concerns the process of treating water coming from sludge samples which were provided from a municipal sewage plant. To these samples the following compositions were added in varying amounts:
(a) a cationic polyacrylamide having cationic acrylic acid monomer units, the polyacrylamide being commercialised under the trade name Praestol™ 853 BC,
(b) the polyacrylamide mentioned under (a) in combination with iron(III) chloride. $FeCl_3$ was provided as an 10 vol % aqueous solution,
(c) the polyacrylamide mentioned under (a) in combination with the surface-reacted natural calcium carbonate.

The surface-reacted natural calcium carbonate was prepared as indicated above in Example 4.

Each sample was subjected to the Sieving Test Method described above and time for dewatering the filtrate as well as clarity of the water running through the filter were determined.

The results are summarized in Table 5.

TABLE 5

| Dewatering according to Sieving Test Method | | | | | |
|---|---|---|---|---|---|
| De-watering time [sec] with added amount of PAA of 4.8 kg/t dry matter | Clarity | De-watering time [sec] with added amount of PAA of 5.2 kg/t dry matter | Clarity | De-watering time [sec] with added amount of PAA of 5.5 kg/t dry matter | Clarity |
| Polyacrylamide, no pretreatment | | | | | |
| 40 | 16 | 25 | 21 | 17 | 26 |
| PAA with 0.5 kg $FeCl_3/m^3$ sludge | | | | | |
| 31 | 20 | 18 | 27 | 16 | 32 |
| PAA with 0.5 kg surface-reacted $CC/m^3$ sludge | | | | | |
| 32 | 18 | 23 | 22 | 20 | 26 |
| PAA with 2 kg $FeCl_3/m^3$ sludge | | | | | |
| 10 | 46 | 9 | 46 | 8 | 46 |
| PAA with 2 kg surface-reacted $CC/m^3$ sludge | | | | | |
| 24 | 28 | 19 | 33 | 14 | 46 |

The results indicate that the surface-reacted natural calcium carbonate in combination with a polymeric flocculant such as polyacrylamide is an efficient flocculation system, comparable to flocculation systems commonly used such as iron(III) chloride in combination with polyacrylamide.

Example 6

The example concerns the process of treating water coming from clay suspensions. These clay suspension samples were treated with an iron(III) chloride flocculant, a surface-reacted calcium carbonate which has been prepared in the presence of a silicate and is stabilised by a cationic dispersant (abbreviated as CC1), and a surface-reacted calcium carbonate without dispersant (abbreviated as CC2), respectively. In some experiments, a polyacrylamide flocculant, either PAA1 or PAA2, was additionally used.

For each sample, the following properties were measured:
(i) turbidity of the solution after sedimentation,
(ii) the time needed to achieve the final turbidity value,
(iii) mass, volume, and density of the filter cake.

The surface-reacted natural calcium carbonate CC1 was prepared as follows:

A high solids slurry of finely divided natural calcium carbonate originating from Vermont, U.S.A, is diluted to achieve a suspension of approximately 20% by weight of dry matter. The slurry thus formed is then treated by slow simultaneous addition of phosphoric acid and sodium silicate at a temperature of approximately 55° C. A slurry of 19% by weight of dry matter of a product featuring a BET specific surface area of 55 $m^2/g$, a d50 of 1.5 µm measured by means of the Sedigraph™ 5100 from Micromeritics™ is obtained.

The slurry is then dewatered to 32% by weight of dry matter and subsequently dispersed using a cationic dispersant.

The surface-reacted natural calcium carbonate CC2 was prepared as follows:

Finely divided natural calcium carbonate originating from Omey, France, is suspended to achieve a suspension of approximately 20% by weight of dry matter.

The slurry thus formed is then treated by slow addition of phosphoric acid at a temperature of approximately 55° C. A slurry of product featuring a BET specific surface area of 41 $m^2/g$ according to ISO standard 92777, a d50 of 1.5 µm measured by means of the Sedigraph™ 5100 from Micromeritics™ is obtained.

Polyacrylamide PAA1 is a cationic flocculant, the positive charge being introduced by cationic acrylamide derivative units. PAA1 is available under its trade name PRAESTOL® 611.

Polyacrylamide PAA2 is a medium anionic flocculant, available under its trade name PRAESTOL® 2540.

The results are summarized in Table 6.

TABLE 6

Treatment of clay suspensions

| Primary + Secondary additives | CC1 (kg/t dry) | CC2 (kg/t dry) | FeCl3 (kg/t dry) | PAA1 (kg/t dry) | PAA2 (ml) | Turbidity 1 | 2 | 3 | 4 |
|---|---|---|---|---|---|---|---|---|---|
| 1 | | | | | 0 | 437 | 431 | 419 | 413 |
| 2 CC1 | 67 | | | | | 24 | 22.2 | 22.2 | 21.7 |
| 3 CC1 + PAA1 | 67 | | | 0.008 | | 13.3 | 12.2 | 12.2 | 11.4 |
| 4 CC1 + PAA1 | 67 | | | 0.042 | | 7.5 | 8.71 | 7.74 | 7.81 |
| 5 PAA1 | | | | 0.042 | | 157 | 157 | 154 | 150 |
| 6 CC1 + PAA1 | 67 | | | 0.042 | | 26.6 | 23.5 | 24.2 | 20.2 |
| 7 CC1 | 67 | | | | 0.5 | 12.7 | 14.9 | 14.1 | 13.2 |
| 8 FeCl3 | | | 33 | | | 93.3 | 92.1 | 91.1 | 94.4 |
| 9 FeCl3 | | | 67 | | | | | | |
| 10 CC2 + PAA2 | | 67 | | | 0.5 | 148 | 146 | 144 | 151 |
| 11 CC2 | | 67 | | | | 350 | 344 | 353 | 347 |
| 12 CC2 + PAA1 | | 67 | | 0.042 | | 170 | 163 | 165 | 158 |
| 13 CC1 | 67 | | | | | 14.7 | 12.7 | 11.8 | 11.6 |
| 14 CC1 + PAA2 | 67 | | | | 0.5 | 16 | 15.4 | 14.8 | 14.4 |
| 15 CC1 + PAA1 | 33 | | | 0.042 | | 28.7 | 28.4 | 28.3 | 27.9 |
| 16 CC1 + PAA2 | 33 | | | | 0.5 | 29.8 | 28.2 | 28.5 | 28.4 |
| 17 FeCl3 + PAA1 | | | 33 | 0.042 | | 44 | 42.7 | 44.1 | 42 |
| 18 FeCl3 + PAA2 | | | 33 | | 0.5 | 60.9 | 61.3 | 59.3 | 59.4 |
| 19 FeCl3 + PAA1 | | | 67 | 0.042 | | | | | |
| 20 FeCl3 + PAA2 | | | 67 | | 0.5 | | | | |

| | PAA2 (kg/t dry) | Primary to secondary additive ratio | Turbidity | Time (min:sec) 150 ml | 100 ml | 50 ml | mass (g) | vol (ml) | density |
|---|---|---|---|---|---|---|---|---|---|
| 1 | | | 425 | | | | | | |
| 2 | | | 23 | | | | | | |
| 3 | | 8000 | 12 | | | | | | |
| 4 | | 1600 | 8 | | | | | | |
| 5 | | | 155 | | | | | | |
| 6 | | 1600 | 24 | | | | | | |
| 7 | 0.042 | 1600 | 14 | | | | | | |
| 8 | | | 93 | | | | 58 | 56 | 1.04 |
| 9 | | | Too turbid to measure | | | | | | |
| 10 | 0.042 | 1600 | 147 | 0:52 | 1:45 | | 40 | 43 | 0.93 |
| 11 | | | 349 | 3:24 | 6:47 | | 58 | 58 | 1.00 |
| 12 | | 1600 | 164 | 0:55 | 2:13 | 11:10 | 50 | 47 | 1.06 |
| 13 | | | 13 | 0:49 | 2:30 | | 65 | 62 | 1.05 |
| 14 | 0.042 | 1600 | 15 | | 0:20 | 3:00 | 49 | 46 | 1.06 |
| 15 | | 800 | 28 | 0:50 | 2:01 | | 49 | 48 | 1.03 |
| 16 | 0.042 | 800 | 29 | 0:13 | 0:36 | 4:00 | 48 | 45 | 1.07 |
| 17 | | 800 | 43 | 0:34 | 1:36 | | 62 | 59 | 1.04 |
| 18 | 0.042 | 800 | 60 | 1:15 | 2:30 | | 62 | 60 | 1.03 |
| 19 | | 1600 | | Too turbid to measure | | | | | |
| 20 | 0.042 | 1600 | | Too turbid to measure | | | | | |

CC1: Surface-reacted natural calcium carbonate which was prepared in the presence of a silicate and dispersed with a cationic dispersant
CC2: Surface-reacted natural calcium carbonate without dispersant
Primaiy additive (SRCC of FeCl3) was added as kg per m³ slurry (g/L slurry)
Starting solids of clay was 3%.
Density of solution taken as ~1 g/ml.

The results of Table 6 indicate that the use of the surface-reacted natural calcium carbonate, optionally in combination with a polyacrylamide flocculant, significantly reduces turbidity at high flocculation rate (i.e. quickly achieving final turbidity value). Furthermore, a low volume filter cake (i.e. improved compactness) can be obtained, thereby significantly reducing disposal costs.

Example 7

The example concerns the process of treating water coming from cow manures. The cow manure samples were treated with an iron(III) chloride flocculant, a surface-reacted calcium carbonate which has been prepared in the presence of a silicate and is stabilised by a cationic dispersant (abbreviated as CC1), and a surface-reacted calcium carbonate without dispersant (abbreviated as CC2), respectively. In some experiments, a polyacrylamide flocculant, either PAA1 or PAA2, was additionally used.

For each sample, the following properties were measured:
(i) solids content,
(ii) the time needed for settlement of the precipitated solids,
(iii) mass and volume of the filter cake.

The surface-reacted natural calcium carbonates CC1 and CC2 were prepared as described above in Example 6. The polyacrylamide flocculants correspond to those used in Example 6.

The results are summarized in Table 7.

TABLE 7

Treatment of manure

| | Manure (g) | Prim. Additive Type | Sec. Floc | FeCl3 (kg/t dry) | CC1 (kg/t dry) | CC2 (kg/t dry) | PAA1 (kg/t) | PAA2 (kg/t) | Ratio Prim/Sec Additive | Solids | Volume of cake (ml) | Mass Cake (g) | Times |
|---|---|---|---|---|---|---|---|---|---|---|---|---|---|
| 1 | 200 | None | n/a | | | | | | | | 200 | | nothing settled to the naked eye |
| 2 | 200 | FeCl3 | n/a | 56 | | | | | | 0.51% | 150 | | settled 50 ml in 13 minutes, 100 in 50 minutes |
| 3 | 200 | n/a | Cationic | | | | 5 | | | 0.51% | 40.5 | 40.3 | full settlement in 4.5-5 minutes |
| 4 | 200 | CC1 | n/a | | 111 | | | | | 0.69% | 34 | 33.9 | full settlement in 4.5-5 minutes |
| 5 | 200 | CC1 | Cationic | | 111 | | 5 | | 22 | 0.46% | 44 | 43.9 | almost full settlement in 25 sec. |
| 6 | 200 | CC1 | Anionic | | 111 | | | 5 | 22 | 0.53% | 37 | 36.7 | almost full settlement in 2 minutes |
| 7 | 200 | FeCl3 | n/a | 111 | | | | | | 0.60% | 162 | 163.4 | in 15 minutes only settled about 20-30 ml |
| 8 | 200 | FeCl3 | Cationic | 111 | | | 5 | | 22 | 0.68% | 103 | 103.2 | settled 50 ml in 5.5 minutes, 100 in 15 minutes |
| 9 | 200 | FeCl3 | Cationic | 56 | | | 5 | | 11 | 0.38% | 106 | 107 | settled ~100 ml in 1-2 min but never changed after that |
| 10 | 200 | FeCl3 | Cationic | 28 | | | 5 | | 6 | 0.34% | 78 | 77.7 | settled to final value in about 1 minutes |
| 11 | 200 | CC1 | Cationic | | 111 | | 5 | | 22 | 0.38% | 54 | 53.4 | settled to near full value in 2 min |
| 12 | 200 | CC2 | Cationic | | | 111 | 5 | | 22 | 0.41% | 53 | 54.6 | settled to near full value in 2 min |
| 13 | 200 | CC1 | Cationic | | 56 | | 5 | | 11 | 0.49% | 55 | 56.4 | settled to near full value in 1 min |
| 14 | 200 | CC2 | Cationic | | | 56 | 5 | | 11 | 0.47% | 40 | 39.3 | settled to near full value in 20 sec |

Starting solids of the manure was 1.79%.
Added 3.6 g of 0.5% dispersant each time of the 200 g of 1.79% solids material 0.01 = 3.6 * .005/(200 * .0179) = 0.0050 g/g = 5 kg/t The results indicate that the use of the surface-reacted natural calcium carbonate results in efficient flocculation at high rate of settlement. Furthermore, the volume of the filter cake can be decreased significantly.

The invention claimed is:

1. A process for the purification of water comprising
(a) obtaining a surface-treated natural calcium carbonate that was prepared by treating a natural calcium carbonate from a natural source that is not saturated with heavy metals with an acid and carbon dioxide in water to obtain surface-treated natural calcium carbonate, wherein the carbon dioxide is formed in situ and/or supplied externally, and wherein the surface-treated natural calcium carbonate has a specific surface area of from 5-200 m²/g as measured using nitrogen and BET method;
(b) contacting the water to be purified with (i) the surface-treated natural calcium carbonate from step (a) or (ii) an aqueous suspension comprising the surface-treated natural calcium carbonate from step (a) having a pH of greater than 6.0 measured at 20° C., so that the surface-treated natural calcium carbonate absorbs impurities in the water; and
(c) separating the surface-treated natural calcium carbonate with absorbed impurities from the water after step (b) has been conducted.

2. The process according to claim 1, wherein the surface-treated natural calcium carbonate is prepared as an aqueous suspension having a pH of greater than 6.5, measured at 20° C.

3. The process according to claim 1, wherein the surface-treated natural calcium carbonate is prepared as an aqueous suspension having a pH of greater than 7.0, measured at 20° C.

4. The process according to claim 1, wherein the surface-treated natural calcium carbonate is prepared as an aqueous suspension having a pH of greater than 7.5, measured at 20° C.

5. The process according to claim 1, wherein the natural calcium carbonate is marble, calcite, chalk, dolomite, limestone, or mixtures thereof.

6. The process according to claim 1, wherein the acid has a $pK_a$ at 25° C. of 2.5 or less.

7. The process according to claim 1, wherein the acid has a pKa at 25° C. of 0 or less.

8. The process according to claim 7, wherein the acid is sulphuric acid, hydrochloric acid, or mixtures thereof.

9. The process according to claim 1, wherein the acid has a $pK_a$ at 25° C. of from 0 to 2.5.

10. The process according to claim 9, wherein the acid is $H_2SO_3$, $HSO_4^-$, $H_3PO_4$, oxalic acid, or mixtures thereof.

11. The process according to claim 1, wherein the natural calcium carbonate is treated with the acid and the carbon dioxide in the presence of at least one silicate, silica, aluminium hydroxide, earth alkali metal aluminate, magnesium oxide, or mixtures thereof.

12. The process according to claim 11, wherein the at least one silicate is an aluminium silicate, a calcium silicate, or an earth alkali metal silicate.

13. The process according to claim 1, wherein the surface-treated natural calcium carbonate has a mean grain diameter of from 0.1 to 50 μm, measured according to the sedimentation method.

14. The process according to claim 1, wherein the surface-treated natural calcium carbonate has an intra-particle porosity within the range of 20% vol to 40% vol, measured by mercury porosimetry.

15. The process according to claim 1, wherein the water is contacted with an aqueous suspension comprising surface-treated natural calcium carbonate.

16. The process according to claim 15, wherein the aqueous suspension comprising surface-treated natural calcium carbonate is stabilized with a dispersant.

17. The process according to claim 16, wherein the surface-treated natural calcium carbonate is stabilized with a cationic dispersant, and wherein the surface-treated natural calcium carbonate has been prepared from marble in the presence of at least one silicate.

18. The process according to claim 1, wherein the surface-treated natural calcium carbonate is used in powder form and/or in the form of granules.

19. The process according to claim 1, wherein the water to be purified is brought into contact with the surface-treated natural calcium carbonate by surface filtration, depth filtration and/or alluvium filtration.

20. The process according to claim 1, wherein a polymeric flocculant is introduced after the introduction of the surface-treated natural calcium carbonate.

21. The process according to claim 20, wherein the polymeric flocculant is anionic.

22. The process according to claim 20, wherein the polymeric flocculant is cationic.

23. The process according to claim 20, wherein the polymeric flocculant is polyacrylamide.

24. The process according to claim 23, wherein the polyacrylamide has a weight average molecular weight $M_w$ in the range of 100,000 g/mole to 10,000,000 g/mole.

25. The process according to claim 23, wherein the polyacrylamide has a negative overall charge and comprises comonomer units derived from (meth)acrylic acid.

26. The process according to claim 23, wherein the polyacrylamide has a positive overall charge and comprises comonomer units derived from aminoalkyl(meth) acrylates.

27. The process according to claim 20, wherein the surface-treated natural calcium carbonate with absorbed impurities and the polymeric flocculant are separated from the water by sedimentation or filtration.

28. The process according to claim 27, wherein the surface-treated natural calcium carbonate with absorbed impurities and the polymeric flocculant are separated from the water by surface filtration, depth filtration and/or alluvium filtration.

29. The process according to claim 1, wherein the pH of the water to be purified is adjusted to a value of greater than 6.5 before being brought into contact with the surface-treated natural calcium carbonate.

30. The process according to claim 1, wherein the water to be purified is industrial waste water, drinking water, urban waste water, waste water from breweries or other beverage industries, or water in the paper industry.

31. The process according to claim 1, wherein the water to be purified contains heavy metal impurities and/or organic impurities.

32. The process according to claim 1, wherein the water to be purified contains microorganisms.

33. The process according to claim 1, wherein the water to be purified contains at least one compound selected from polycyclic compounds, cholesterol, and/or endocrine disrupting compounds.

34. The process according to claim 1, wherein the surface-treated natural calcium carbonate is used in combination with activated carbon.

35. The process according to claim 1, wherein the surface-treated natural calcium carbonate with absorbed impurities is separated from the water by sedimentation or filtration.

36. The process according to claim 1, wherein the carbon dioxide is formed in situ by acid treatment.

37. The process according to claim 1, wherein the carbon dioxide is supplied from an external source.

* * * * *